(12) United States Patent
Uematsu et al.

(10) Patent No.: US 11,300,731 B2
(45) Date of Patent: Apr. 12, 2022

(54) OPTICAL FIBER LATERAL INPUT/OUTPUT DEVICE

(71) Applicant: NIPPON TELEGRAPH AND TELEPHONE CORPORATION, Tokyo (JP)

(72) Inventors: Takui Uematsu, Musashino (JP); Hidenobu Hirota, Musashino (JP); Hiroyuki Iida, Musashino (JP); Tetsuya Manabe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/254,954

(22) PCT Filed: Jun. 26, 2019

(86) PCT No.: PCT/JP2019/025300
§ 371 (c)(1),
(2) Date: Dec. 22, 2020

(87) PCT Pub. No.: WO2020/004439
PCT Pub. Date: Jan. 2, 2020

(65) Prior Publication Data
US 2021/0124121 A1    Apr. 29, 2021

(30) Foreign Application Priority Data
Jun. 29, 2018   (JP) .............................. JP2018-124691

(51) Int. Cl.
*G02B 6/28* (2006.01)

(52) U.S. Cl.
CPC .................................. *G02B 6/2852* (2013.01)

(58) Field of Classification Search
None
See application file for complete search history.

(56) References Cited

FOREIGN PATENT DOCUMENTS

JP           201540916 A        3/2015

*Primary Examiner* — Omar R Rojas

(57) ABSTRACT

An object is to provide a highly versatile optical fiber local-light detection apparatus capable of supporting various types of coated optical fibers. An optical fiber local-light detection apparatus according to the present invention includes: a first jig 11 including a recess portion 22 curved along a longitudinal direction with respect to a coated optical fiber 100 and a light input/output unit 14 configured to emit light to the coated optical fiber 100 that is bent and to receive light leaking from the coated optical fiber 100; a second jig 12 including at least one protrusion portion 23 that is curved along the longitudinal direction with respect to the coated optical fiber 100, the second jig configured to clamp the coated optical fiber 100 with the recess portion 22 of the first jig 11, in accordance with a type of the coated optical fiber 100; a pressing portion configured to apply pressing force in a direction in which the recess portion 22 of the first jig 11 and the at least one protrusion portion 23 of the second jig 12 mutually approach, to bend the coated optical fiber 100; and a switching mechanism configured to switch the at least one protrusion portion 23 to a protrusion portion corresponding to the type of the coated optical fiber 100.

7 Claims, 4 Drawing Sheets

(a)   (b)

1

OPTICAL FIBER LATERAL INPUT/OUTPUT DEVICE

CROSS-REFERENCE TO RELATED APPLICATIONS

This application is a 371 U.S. National Phase of International Application No. PCT/JP2019/025300, filed on Jun. 26, 2019, which claims priority to Japanese Application No. 2018-124691 filed on Jun. 29, 2018. The entire disclosures of the above applications are incorporated herein by reference.

TECHNICAL FIELD

The present disclosure relates to an optical fiber local-light coupling apparatus that is configured to input and output light through the side of a bent coated optical fiber.

BACKGROUND ART

As techniques for inputting and outputting optical signals through an optical fiber without cutting the optical fiber, an optical fiber local-light coupling technique has been studied, in which bending is applied to an existing optical fiber (working optical fiber), another optical fiber (probe optical fiber) is placed facing the bent part from the side surface, an optical signal is injected from a tip end portion of the probe optical fiber, and an optical signal emitted from the working optical fiber is received at the tip end portion of the probe optical fiber (see, for example, Patent literature 1).

CITATION LIST

Patent Literature

Patent Literature 1: JP 2015-040916 A

SUMMARY OF THE INVENTION

Technical Problem

Various types of coated optical fibers are laid at a connection point for existing lines, and the connection point is one of main areas to which the optical fiber local-light coupling technique is applied. Even where only a single-core covered fiber is concerned, it includes a variety of outer diameters of 0.25 mm, 0.5 mm, and 0.9 mm. In a known technique, an optimal bent shape is designed in accordance with coated optical fibers, to which the bend is applied, thus a technician is required to prepare optical fiber local-light detection apparatuses dedicated for the respective types of single-core coated fibers. Thus, the technician can work on all the single-core covered fibers, and perform the work while switching among the apparatuses in accordance with the coated fiber types. In other words, the known optical fiber local-light detection apparatus has a predetermined type of the coated optical fiber that can be worked, and thus has limited versatility.

Therefore, in order to solve the problem described above, an object of the present invention is to provide a highly versatile optical fiber local-light detection apparatus capable of supporting various types of coated optical fibers.

Means for Solving the Problem

In order to achieve the above object, the optical fiber local-light detection apparatus according to the present invention has a function of changing the structure of the bending imparting section in accordance with the outer diameter of the coated optical fiber, such that a desired bending shape can be formed for coated optical fibers with various outer diameters.

Specifically, an optical fiber local-light detection apparatus according to the present invention includes: a first jig including a recess portion curved along a longitudinal direction with respect to a coated optical fiber and a light input/output unit configured to emit light to the coated optical fiber that is bent and to receive light leaking from the coated optical fiber; a second jig including at least one protrusion portion that is curved along the longitudinal direction with respect to the coated optical fiber, the second jig configured to clamp the coated optical fiber with the recess portion of the first jig, in accordance with a type of the coated optical fiber; a pressing portion that is configured to apply pressing force in a direction in which the recess portion of the first jig and the at least one protrusion portion of the second jig mutually approach, to bend the coated optical fiber; and a switching mechanism configured to switch the at least one protrusion portion to a protrusion portion corresponding to the type of the coated optical fiber.

In the present optical fiber local-light detection apparatus, the at least one protrusion portion, which is configured to apply bending to the coated optical fiber, has a structure adaptable to a type of the coated optical fiber. Accordingly, the at least one protrusion portion is changed in accordance with the type of the coated optical fiber. Thus, the present invention can provide a highly versatile optical fiber local-light detection apparatus capable of supporting various types of coated optical fibers.

For example, the at least one protrusion portion includes a plurality of protrusion portions, the second jig has the plurality of the protrusion portions, each of the plurality of the protrusion portions corresponding to a type of the coated optical fiber, the plurality of the protrusion portions are arranged along a direction X that is orthogonal to a longitudinal direction Z of the coated optical fiber and to a direction Y in which the pressing force is applied by the pressing portion, and the switching mechanism has a structure that is configured to drive the second jig in the direction X such that the coated optical fiber can be clamped between the recess portion of the first jig and one of the plurality of the protrusion portions corresponding to the type of the coated optical fiber.

In the case of this structure, the structure of the switching mechanism, the structure being configured to drive the second jig in the direction X, includes: a coarse adjustment unit configured to move the at least one protrusion portion in accordance with the type of the coated optical fiber; and a fine adjustment unit configured to adjust a relative position between an optical axis of light incident on the coated optical fiber and a core of the coated optical fiber.

Furthermore, for example, the at least one protrusion portion of the second jig has a continuously variable shape, and the switching mechanism is configured to move the at least one protrusion portion continuously such that the coated optical fiber is clamped between the recess portion of the first jig and a portion of the at least one protrusion portion with a shape corresponding to the type of the coated optical fiber.

Furthermore, for example, the at least one protrusion portion of the second jig has a stepwise variable shape, and the switching mechanism is configured to move the at least one protrusion portion stepwise such that the coated optical fiber is clamped between the recess portion of the first jig and a portion of the at least one protrusion portion with a shape corresponding to the type of the coated optical fiber.

The second jig may have a guide groove to which the coated optical fiber fits in the at least one protrusion portion, and the guide groove has a shape corresponding to the type of coated optical fiber corresponding to the at least one protrusion portion.

In this case, the guide groove is a V-shaped groove that satisfies:

$$a(1+1/\sin \theta) \geq w/\tan \theta,$$

where a bottom angle is $2\theta$, an opening width is $2w$, and an outer diameter of the coated optical fiber is $2a$.

The inventions described above can be combined with each other as far as possible.

Effects of the Invention

The present invention can provide a highly versatile optical fiber local-light detection apparatus capable of supporting various types of coated optical fibers.

DESCRIPTION OF EMBODIMENTS

Hereinafter, embodiments of the present invention will be described with reference to the drawings. The embodiment described below is an example of the present disclosure, and the present disclosure is not limited to the following embodiment. In this specification and the drawings, constituent elements having the identical reference signs are assumed to be the same.

Figure 1:
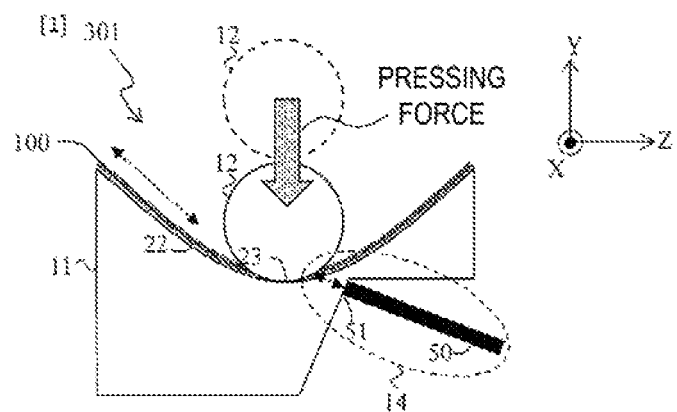
FIG. 1 is a diagram illustrating an optical fiber local-light detection apparatus embodying the principles of the present invention.

FIG. 1 is a diagram illustrating an optical fiber local-light detection apparatus 301 according to the present embodiment. The optical fiber local-light detection apparatus 301 includes: a first jig 11 including a recess portion 22 curved along a longitudinal direction with respect to a coated optical fiber 100 and a light input/output unit 14 configured to emit light to the coated optical fiber 100 that is bent and to receive light leaking from the coated optical fiber 100; a second jig 12 including at least one protrusion portion 23 that is curved along the longitudinal direction with respect to the coated optical fiber 100, the second jig configured to clamp the coated optical fiber 100 with the recess portion 22 of the first jig 11, in accordance with a type of the coated optical fiber 100; a pressing portion (not illustrated) configured to apply pressing force in a direction in which the recess portion 22 of the first jig 11 and the at least one protrusion portion 23 of the second jig 12 mutually approach, to bend the coated optical fiber 100; and a switching mechanism (not illustrated) configured to switch the at least one protrusion portion 23 to a protrusion portion corresponding to the type of the coated optical fiber 100.

In this specification, as an example of the light input/output unit 14, a probe optical fiber 50 that outputs and receives light to and from the coated optical fiber 100 and a holding portion 51 of the first jig 11 that holds the probe optical fiber 50, are described. Other examples of the light input/output unit 14 may include a lens that is configured to collect leaked light.

Figure 2:
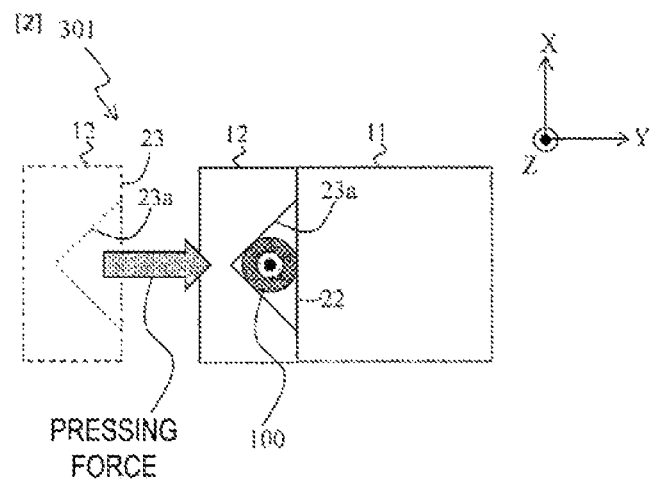
FIG. 2 is a diagram illustrating the optical fiber local-light detection apparatus embodying the principles of the present invention.

FIG. 2 is a cross-sectional view of the optical fiber local-light detection apparatus 301 in FIG. 1, along a plane orthogonal to the Z direction. The second jig 12 has a guide groove 23a, into which the coated optical fiber 100 fits, in the at least one protrusion portion 23, and the guide groove 23a has a shape corresponding to a type of coated optical fiber 100 corresponding to the at least one protrusion portion 23.

The optical fiber local-light detection apparatus 301 clamps the coated optical fiber 100 between the first jig 11 and the second jig 12, and a bending to the coated optical fiber 100 may be formed. A desired bent shape can be formed for the coated optical fiber 100 with various outer diameters, without changing the first jig 11 or the light input/output unit 14, but by only changing the second jig 12 corresponding to the outer diameter of the coated optical fiber 100. In particular, changing the guide groove 23a of the second jig 12 can facilitate the optical fiber local-light detection apparatus 301 to support various outer diameters.

Figure 3:
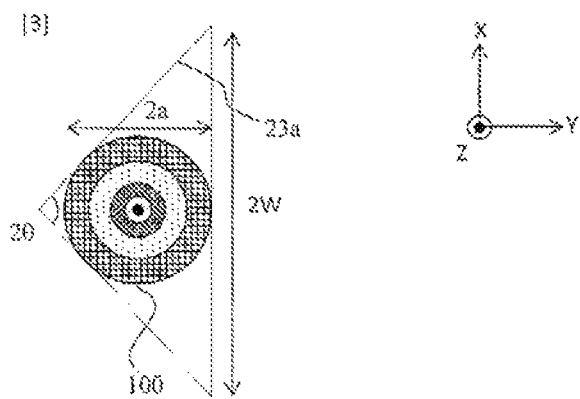
FIG. 3 is a diagram illustrating the optical fiber local-light detection apparatus embodying the principles of the present invention.

FIG. 3 is a diagram illustrating an example of the guide groove 23a. The guide groove 23 is a V-shaped groove that satisfies:

$$a(1+1/\sin \theta) \geq w/\tan \theta,$$

where a bottom angle is $2\theta$, an opening width is $2w$, and the outer diameter of the coated optical fiber 100 is $2a$.

When this relationship is satisfied, the coated optical fiber 100 protrudes out of the V-shaped groove, so that the coated optical fiber 100 and the first jig 11 are in contact with each other and light can be input. When the relationship is not satisfied, a gap exists between the coated optical fiber 100 and the first jig 11. As a result, coupling efficiency is largely compromised.

Example 1

Figure 4:
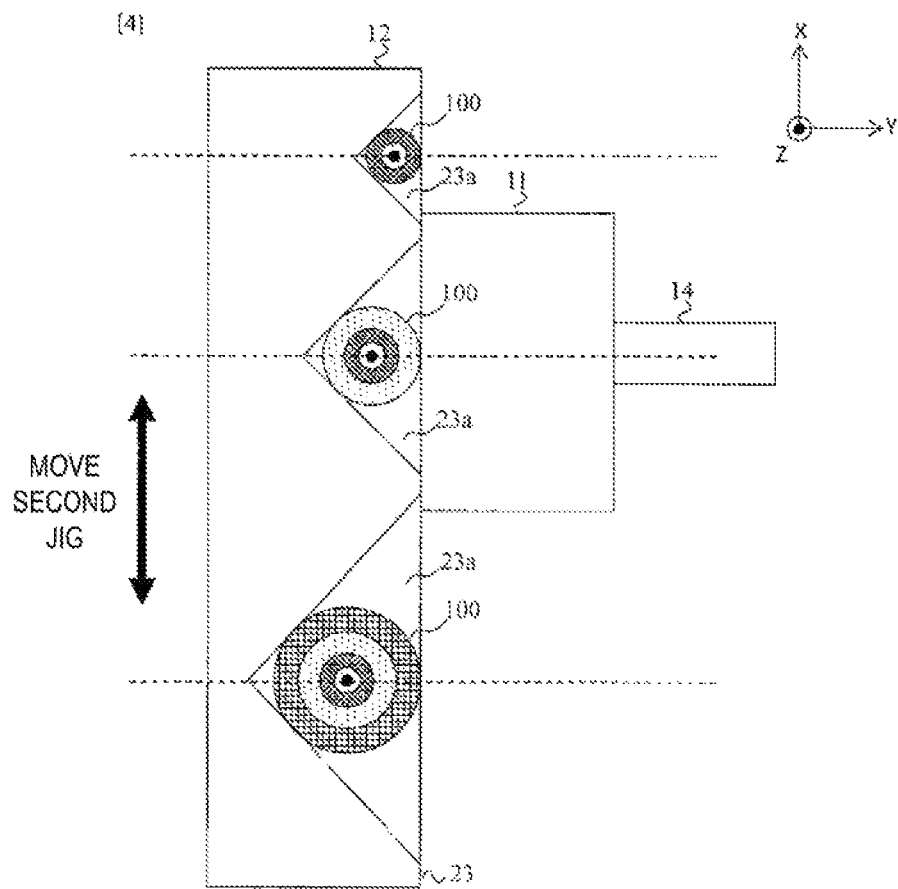
FIG. 4 is a diagram illustrating the optical fiber local-light detection apparatus (Example 1) embodying the principles of the present invention.

FIG. 4 illustrates an example of a structure in which the at least one protrusion portion 23 is changed in accordance with the type of the coated optical fiber 100. In this example, the second jig 12 has the plurality of the protrusion portions 23, each of which corresponds to a type of the coated optical fiber 100, the plurality of the protrusion portions are arranged along the direction X that is orthogonal to a longitudinal direction Z of the coated optical fiber 100 and to a direction Y in which the pressing force is applied by the pressing portion, and the switching mechanism has a structure that is configured to drive the second jig 12 in the direction X such that the coated optical fiber 100 can be clamped between the recess portion 22 of the first jig 11 and one of the plurality of the protrusion portions 23 corresponding to the type of the coated optical fiber 100.

FIG. 4 illustrates an example in which the second jig 12 moves in translational manner in the direction X. In this example, the second jig 12 has three V-shaped grooves respectively corresponding to three types of the coated optical fibers 100 having three different outer diameters (for example, 0.25, 0.5, and 0.9 mm single-core covered fibers). The switching mechanism (not illustrated) moves the second jig 12 in translational motion such that the core center of the coated optical fiber 100, which is a target of the light input/output, matches the optical axis of the light input/output unit 14.

Preferably, the structure of the switching mechanism, the structure being configured to drive the second jig in the direction X, includes a coarse adjustment unit configured to move the at least one protrusion portion in accordance with the type of the coated optical fiber; and a fine adjustment unit configured to adjust a relative position between an optical axis of light incident on the coated optical fiber and a core of the coated optical fiber.

For example, the coarse adjustment unit is a guiding rail on which the second jig 12 can be moved in the direction X, and the fine adjustment unit is a micrometer or fine screw for fine adjustment of the second jig 12 in the direction X.

Example 2

Figure 5:
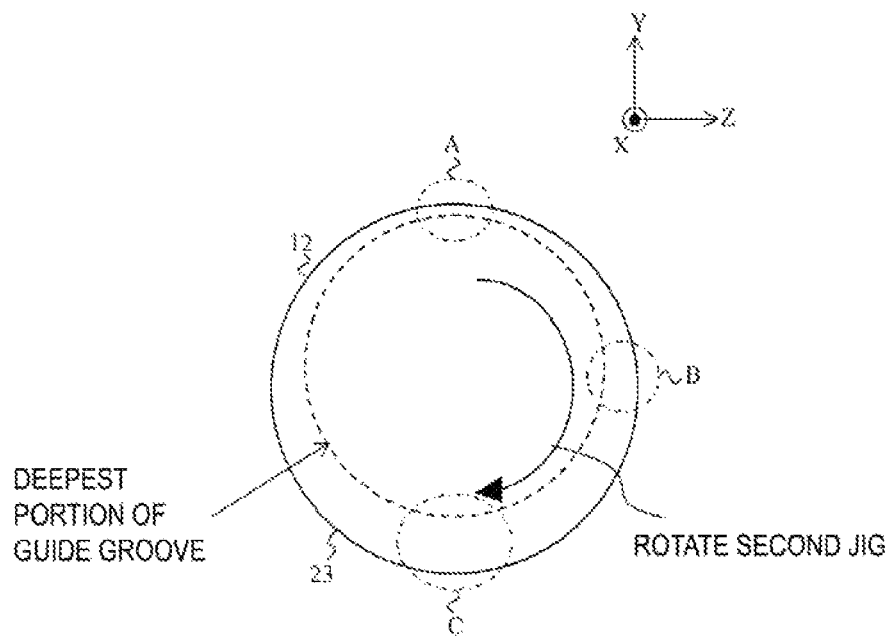
FIG. 5 is a diagram illustrating the optical fiber local-light detection apparatus (Example 1) embodying the principles of the present invention.

FIG. 5 illustrates an example of a structure in which the at least one protrusion portion 23 is changed in accordance with the type of the coated optical fiber 100.

In this example, the at least one protrusion portion 23 of the second jig 12 has a continuously variable shape, and the switching mechanism is configured to move the protrusion portion 23 continuously such that the coated optical fiber 100 is clamped between the recess portion 22 of the first jig 11 and a portion of the at least one protrusion portion 23 with a shape corresponding to the type of the coated optical fiber 100.

FIG. 5 illustrates a structure, in which rotating the second jig 12 changes the size of the guide groove 23a. For example, a portion A is a guide groove for a coated fiber with the smallest outer diameter (for example, a 0.25 mm coated fiber), a portion B is a guide groove for a coated fiber with an intermediate outer diameter (for example, 0.5 mm coated fiber), and a portion C is a guide groove for a coated fiber with the largest outer diameter (for example, a 0.9 mm coated fiber).

The second jig 12 is rotated and adjusted such that the position of the guide groove corresponds to the outer diameter of the coated optical fiber 100 serving as the light input/output target. In a case where a V-shaped groove is used as the guide groove, it needs to be designed to satisfy the formula described in Example 1.

Figure 6:
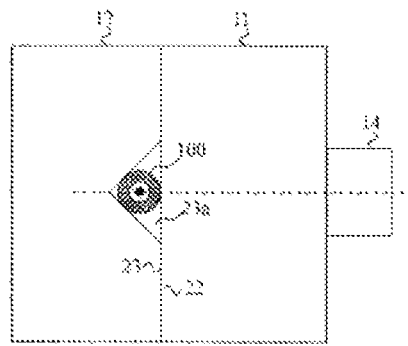
FIG. 6 is a diagram illustrating the optical fiber local-light detection apparatus (Example 2) embodying the principles of the present invention.
Figure 6:
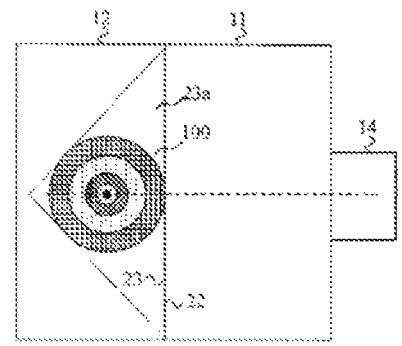
Figure 6:
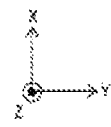

FIG. 6(a) is a cross-sectional view illustrating a state where the second jig 12 is rotated for pressing the coated optical fiber 100 with the outer diameter of 0.25 mm, and the coated optical fiber 100 is pressed with the portion A against the first jig 11.

FIG. 6(b) is a cross-sectional view illustrating a state where the second jig 12 is rotated for pressing the coated optical fiber 100 with the outer diameter of 0.9 mm, and the coated optical fiber 100 is pressed with the portion C against the first jig 11.

Example 3

Figure 7:
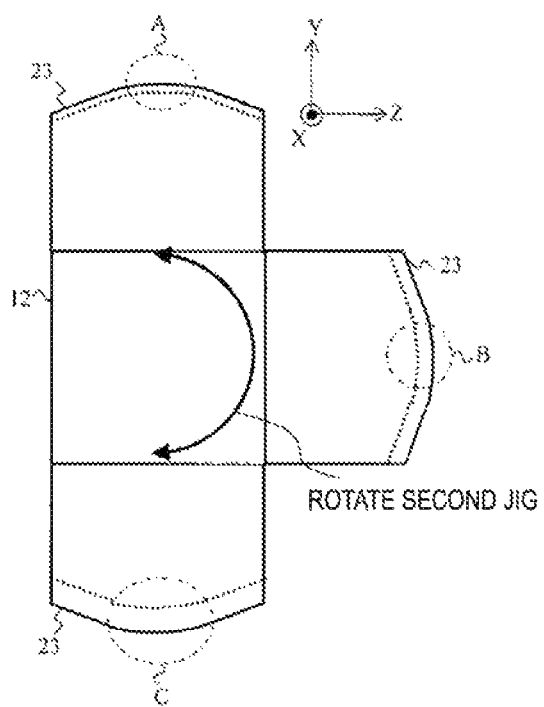
FIG. 7 is a diagram illustrating the optical fiber local-light detection apparatus (Example 3) embodying the principles of the present invention.

FIG. 7 illustrates an example of a structure in which the at least one protrusion portion 23 is changed in accordance with the type of the coated optical fiber 100.

In this example, the at least one protrusion portion 23 of the second jig 12 has a stepwise variable shape, and the switching mechanism is configured to move the at least one protrusion portion 23 such that the coated optical fiber 100 is clamped between the recess portion 22 of the first jig 11 and the portion of the at least one protrusion portion 23 with the shape corresponding to the type of the coated optical fiber 100.

FIG. 7 is a diagram illustrating the second jig 12 of this example. The second jig 12 has three different protrusion portions 23 and each of the three different protrusion portions 23 is capable of pressing a corresponding one of the coated optical fibers 100 with three different outer diameters. For example, a portion A is the protrusion portion 23 having a guide groove for a coated fiber with the smallest outer diameter (for example, a 0.25 mm coated fiber), a portion B is the protrusion portion 23 having a guide groove for a coated fiber with an intermediate outer diameter (for example, 0.5 mm coated fiber), and a portion C is the protrusion portion 23 having a guide groove for a coated fiber with the largest outer diameter (for example, a 0.9 mm coated fiber). These three types are examples, and a plurality of types of coated optical fibers 100, such as two types, four types, five types, and the like may be supported. In a case where a V-shaped groove is used as the guide groove, it needs to be designed to satisfy the formula described in Example 1.

Figure 8:
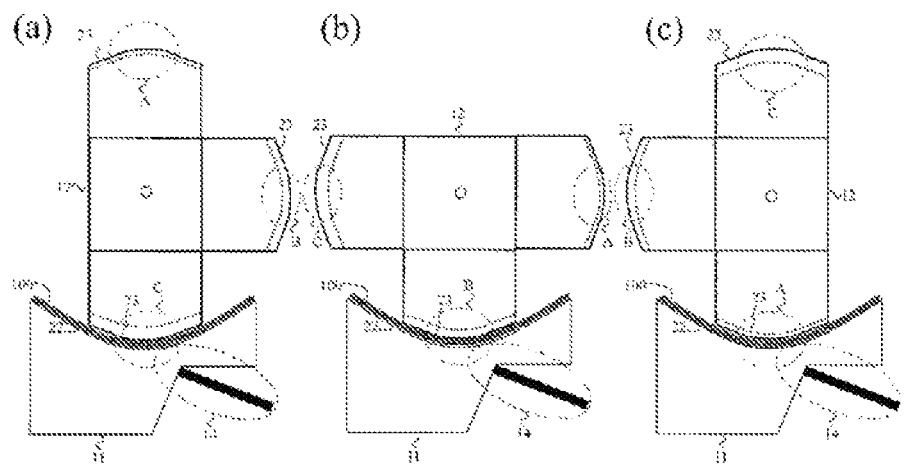
FIG. 8 is a diagram illustrating the optical fiber local-light detection apparatus (Example 3) embodying the principles of the present invention.

FIG. 8 is a diagram illustrating how the coated optical fiber 100 is pressed against the first jig 11, using the second jig 12 rotated by 0 degrees, 90 degrees, or 180 degrees by the switching mechanism to select the protrusion portion 23 corresponding to the outer diameter of the coated optical fiber 100 as the light input/output target.

FIG. 8(a) is a view illustrating a state where the second jig 12 is rotated for pressing the coated optical fiber 100 with the outer diameter of 0.9 mm, and the coated optical fiber 100 is pressed with the portion C against the first jig 11.

FIG. 8(b) is a view illustrating a state where the second jig 12 is rotated for pressing the coated optical fiber 100 with the outer diameter of 0.5 mm, and the coated optical fiber 100 is pressed with the portion B against the first jig 11.

FIG. 8(c) is a view illustrating a state where the second jig 12 is rotated for pressing the coated optical fiber 100 with the outer diameter of 0.25 mm, and the coated optical fiber 100 is pressed with the portion A against the first jig 11.

REFERENCE SIGNS LIST

11 First jig
12 Second jig
14 Light input/output unit
22 Recess curved surface
23 Protrusion curved surface
23a Guide groove
50 Probe optical fiber
51 Holding portion
100 Coated optical fiber
301 Optical fiber local-light coupling apparatus

The invention claimed is:
1. An optical fiber local-light coupling apparatus comprising:

a first jig including a recess portion curved along a longitudinal direction with respect to a coated optical fiber and a light input/output unit configured to emit light to the coated optical fiber that is bent and to receive light leaking from the coated optical fiber;

a second jig including at least one protrusion portion that is curved along the longitudinal direction with respect to the coated optical fiber, the second jig configured to clamp the coated optical fiber with the recess portion of the first jig, in accordance with a type of the coated optical fiber;

a pressing portion configured to apply pressing force in a direction in which the recess portion of the first jig and the at least one protrusion portion of the second jig mutually approach, to bend the coated optical fiber; and a switching mechanism configured to switch the at least one protrusion portion to a protrusion portion corresponding to the type of the coated optical fiber.

2. The optical fiber local-light coupling apparatus according to claim 1, wherein the at least one protrusion portion includes a plurality of protrusion portions, the second jig has the plurality of the protrusion portions, each of the plurality of the protrusion portions corresponding to a type of the coated optical fiber, the plurality of the protrusion portions are arranged along a direction X that is orthogonal to a longitudinal direction Z of the coated optical fiber and to a direction Y in which the pressing force is applied by the pressing portion, and the switching mechanism has a structure that is configured to drive the second jig in the direction X such that the coated optical fiber is clamped between the recess portion of the first jig and one of the plurality of the protrusion portions corresponding to the type of the coated optical fiber.

3. The optical fiber local-light coupling apparatus according to claim 2, wherein the structure of the switching mechanism, the structure being configured to drive the second jig in the direction X, includes:

a coarse adjustment unit configured to move the at least one protrusion portion in accordance with the type of the coated optical fiber; and a fine adjustment unit configured to adjust a relative position between an optical axis of light incident on the coated optical fiber and a core of the coated optical fiber.

4. The optical fiber local-light coupling apparatus according to claim 1, wherein the at least one protrusion portion of the second jig has a continuously variable shape, and the switching mechanism is configured to move the at least one protrusion portion continuously such that the coated optical fiber is clamped between the recess portion of the first jig and a portion of the at least one protrusion portion with a shape corresponding to the type of the coated optical fiber.

5. The optical fiber local-light coupling apparatus according to claim 1, wherein the at least one protrusion portion of the second jig has a stepwise variable shape, and the switching mechanism is configured to move the at least one protrusion portion stepwise such that the coated optical fiber is clamped between the recess portion of the first jig and a portion of the at least one protrusion portion with a shape corresponding to the type of the coated optical fiber.

6. The optical fiber local-light coupling apparatus according to claim 1, wherein the second jig has a guide groove to which the coated optical fiber fits in the at least one protrusion portion, and the guide groove has a shape corresponding to the type of coated optical fiber corresponding to the at least one protrusion portion.

7. The optical fiber local-light coupling apparatus according to claim 6, wherein the guide groove is a V-shaped groove that satisfies:

$$a(1+1/\sin \theta) \geq w/\tan \theta$$

where a bottom angle is $2\theta$, an opening width is $2w$, and an outer diameter of the coated optical fiber is $2a$.

* * * * *